June 7, 1932. L. C. DEMMERLE 1,862,077
DOMESTIC COOKING VESSEL
Original Filed July 18, 1930  2 Sheets-Sheet 2
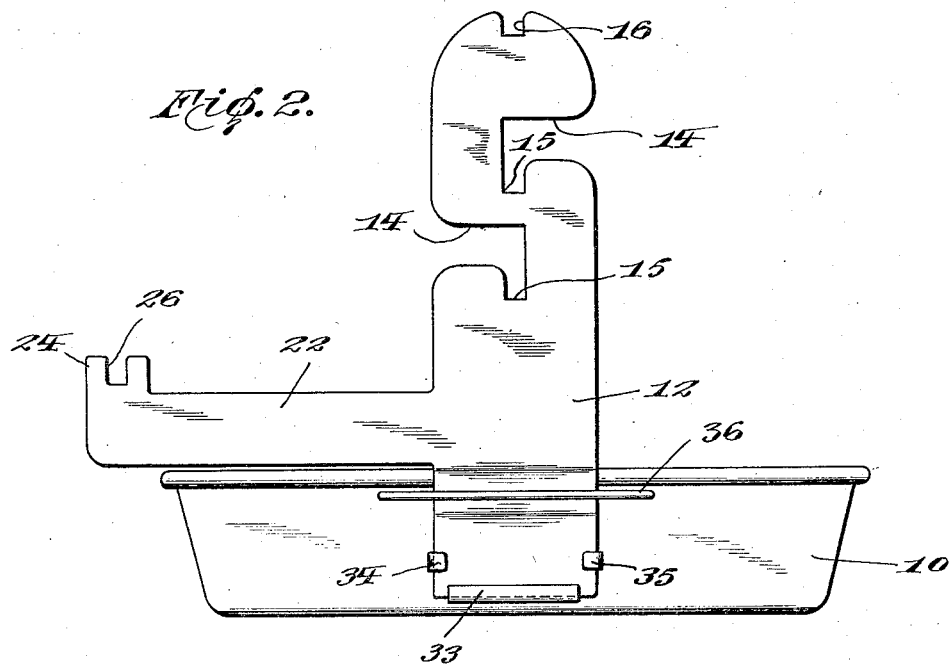
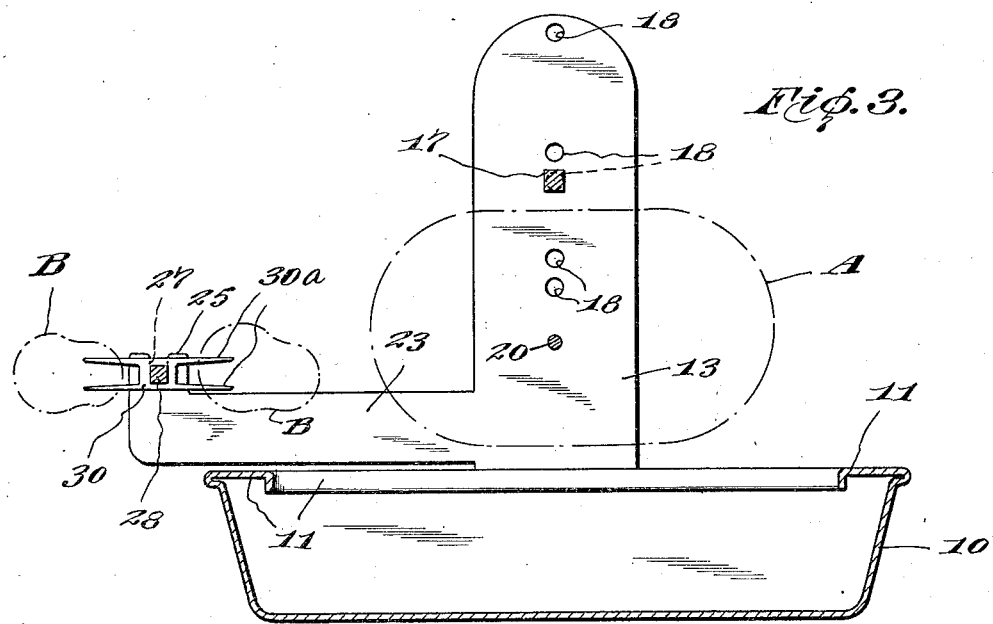
Inventor:
Louis C. Demmerle.
By F. V. Winters.
Attorney Patented June 7, 1932

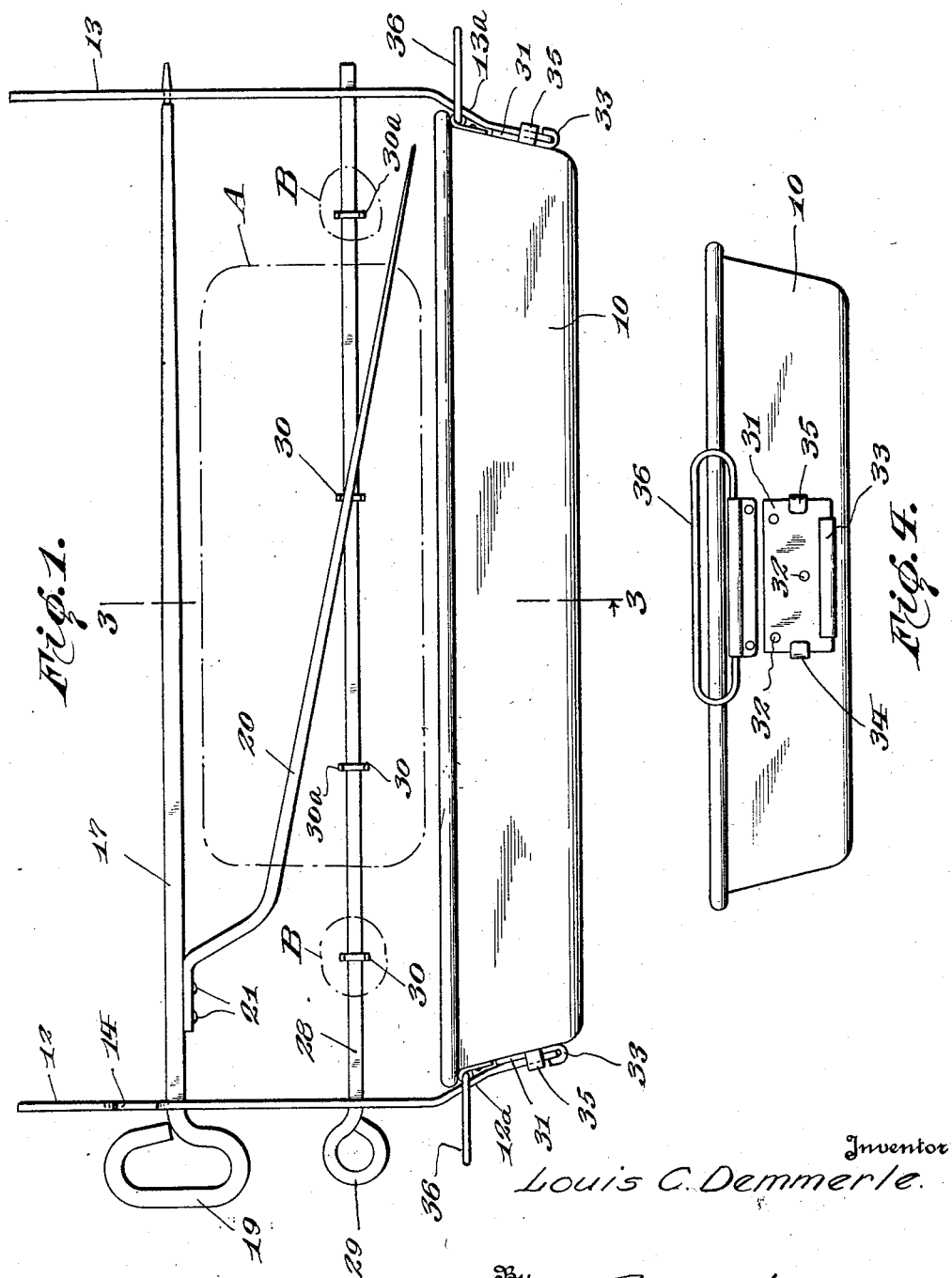

1,862,077

UNITED STATES PATENT OFFICE

LOUIS C. DEMMERLE, OF CRANFORD, NEW JERSEY, ASSIGNOR TO EDWIN T. GRAY, OF NEW YORK, N. Y.

DOMESTIC COOKING VESSEL

Application filed July 18, 1930, Serial No. 468,925. Renewed October 30, 1931.

This invention relates generally to domestic cooking vessels and the improvements are directed to a novel form of roaster adapted to bake vegetables, poultry, or the like.

Primarily, the object of the invention resides in the provision of a receptacle adapted to receive the extracts or juices from the roasted or baked poultry or meats, said materials to be cooked being positioned above and over said receptacle in any number of positions with respect to the same.

A secondary object of the invention is to provide a receptacle having an inturned flange whereby the danger of spilling of the contents thereof may be avoided.

Another object is to provide means whereby a pair of oppositely disposed standards may be detachably associated with said receptacle, said standards serving to support certain impaling means for the material to be cooked.

Another object of the invention is the provision of novel supporting means whereby the impaled meats, or the like, may be variably positioned above the receptacle, said supporting means including notches cooperating with the impaling means whereby rotation of the impaling means is prevented until the operator desires to turn the meat.

Still another object is to provide a pair of oppositely disposed standards having laterally directed arms adapted to support certain article-supporting means in a definite position with respect to said receptacle.

A still further object of the invention resides in the provision of secondary impalers, adjustably carried by said article-supporting means whereby a plurality of potatoes, or other vegetables, may be maintained in a suitable position for baking.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is an elevation of the article showing the impaling means and article-supporting means carrying certain material to be cooked, said material being diagrammatically indicated by dot-and-dash lines.

Fig. 2 is an end elevation as viewed at the left of Fig. 1, illustrating one of the standards, but with the impaling means and article-supporting means both removed.

Fig. 3 is a vertical sectional view on the line 3—3 of Fig. 1, depicting the marginal inturned flange of the receptacle and the arrangement of a plurality of apertures in the other standard.

Fig. 4 is an end view of the receptacle, with the standards detached to show the means for removably supporting said standards.

Referring now more in particular to the accompanying drawings, wherein like characters of reference denote similar parts throughout the several views, let 10 indicate the receptacle portion of my novel and improved roaster, said receptacle being relatively shallow to present a pan-like structure and adapted to catch and retain the juices or greases extracted from the meats or poultry during the cooking operation. Upon inspection of Fig. 3, it will be observed that the marginal rim of said receptacle is formed to present an inturned flange 11 which serves to prevent an overflowing of the hot grease or gravy when the receptacle is being transported from an oven to a serving point, thus removing the likelihood of burning the person handling the article.

As previously pointed out, it is proposed to provide an arrangement whereby the material to be baked or roasted may be positioned over and above said receptacle, said material being so supported that its position, as aforesaid, may be varied, if desired, during the cooking operation, or when it becomes necessary to baste the same.

To this end I provide standards 12 and 13, which are oppositely disposed and detachably associated with the opposite sides of said receptacle, said standard 12 being provided with a plurality of notches 14, presenting downwardly directed rectangular recesses 15 at their inner ends, (see Fig. 2). It will also be observed that the top edge of said standard 12 is also provided with a rectangular recess 16. These rectangular recesses are adapted to receive a rod 17, which presents a squared portion that snugly fits within said recesses and thus said rod is prevented from turning so long as the engagement with the recesses is as aforesaid. The companion standard 13 is provided with a plurality of apertures 18, (see Fig. 3), which receive the other end of said rod 17, whereby said rod is supported as indicated in Fig. 1. From the foregoing it is apparent that the operator may grasp the handle portion 19 of said rod 17 and remove the latter in and out of the selected notches and recesses in standard 12 and in view of the arrangement of the apertures 18 in said standard 13, the elevation or position of said rod 17, over and above said receptacle 10, may be varied as desired. Upon inspection of Fig. 1, it will be noted that I have provided an impaler 20, which is suitably secured to said rod 17, as indicated at 21, said impaler inclining downwardly from said connection and spaced from said rod so that the material A to be cooked may be positioned as indicated in said Fig. 1 and Fig. 3.

It is also proposed to provide an arrangement whereby certain vegetables, such as potatoes, or the like, may be supported by my improved roaster in a manner to preclude burning of said vegetables in that the same are arranged in a suspended position and out of contact with the receptacle itself or parts of an oven.

In the fulfillment of this desired object, each of said standards 12 and 13, (see Figs. 2 and 3), is provided with a laterally directed arm 22 and 23, which may be integrally or otherwise associated with the respective standard, each arm being provided with an upwardly directed extensions 24 and 25, each presenting squared notches or recesses 26 and 27, respectively, said recesses receiving a rod 28, having a handle 29, said rod 28 serving as article-supporting means and having secondary impalers 30 slidably borne thereby whereby a plurality of potatoes, or the like, may be arranged thereon as denoted by the dot-and-dash lines in Figs. 1 and 3.

The means for detachably connecting said standards 12 and 13 to the opposite sides of the receptacle comprises plates 31, one plate being suitably affixed to said sides as indicated at 32, each plate presenting an inturned bottom flange 33, and lateral inturned tongues 34 and 35, said flange 33 and tongues 34 and 35 being spaced from said plates 32 to permit the insertion of the lower portions of said standards as indicated in Figs. 1 and 2, the connection being such as to maintain the standards in the positions indicated, yet permitting of their removal as desired. Upon inspection of Fig. 1, it will be noted that the lower portions of said standards 12 and 13, are suitably bent, as shown at 12ª and 13ª to conform to the sloping sides of the receptacle. In view of the above arrangement the standards may be removed from the receptacle and placed therein in order to reduce the size of the article when not in use and stored.

In view of the arrangement of the inturned flange 11, the receptacle, or the complete article, may be transported by means of handles 36, without danger of spilling the hot extracts from said receptacle. Further, when the material is pierced by said impaler 20, as indicated, the same becomes evenly roasted in its suspended position, its whole exterior surface being accessible to the heat in an oven to the end that the juices may be retained to flavor and moisten the said material. By removing the rod 17 from the recesses 15 and notches 14, said roasts may be basted as desired and further said rod 17 may be raised and turned and held in position in view of the cooperation of the squared rod 17 and the rectangular recesses 15 and 16. As previously pointed out the arrangement of a plurality of apertures 18 in said standard 13 and the plurality of recesses in said standard 12, the roasts may be brought to a close relationship with the bottom of the receptacle or elevated thereabove, and if desired, said roasts may be bathed in the liquid present in said receptacle since the handle 19 may be held in the hand at a suitable angle for permitting said bath.

Obviously, a plurality of arms 22 and 23 may be provided to support a series of article-supporting means 28, and in view of the arrangement of a plurality of secondary impalers 30 a relatively large number of vegetables may be baked at the same time. These impalers 30 may be provided with one or more oppositely directed prongs 30a to receive the vegetables B, as indicated in Fig. 3, and since said impalers are slidably carried by said rod 28, suitable spacing of the vegetables may be attained as desired.

The roaster is admirably adapted for the purposes and objects pointed out hereinbefore and as the standards and their associated parts may be readily disassembled, the article may be stored in a relatively small space. Obviously, the article may be made in various sizes so that its field of usage is not confined to the household, but may extend to restaurants and hotels, or the like.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. An article of the class described comprising a receptacle presenting an inturned flange at the rim thereof, oppositely disposed standards borne by said receptacle, an arm extending laterally from said standards, each of said arms having their extremities notched and article-supporting means removably mounted in the notches of said arms.

2. An article of the class described comprising a receptacle, oppositely disposed standards detachably borne thereby, impaling means positioned over said receptacle and supported by said standards, an arm extending laterally from said standards, each of said arms presenting a notch at the extremity thereof and article-supporting means removably mounted in said notches.

3. An article of the class described comprising a receptacle, oppositely disposed standards detachably borne thereby, one of said standards being provided with a plurality of slots, the other being provided with a plurality of apertures, impaling means positioned over said receptacle and adapted to be selectively supported in variable positions by said notched and apertured standards, an arm extending laterally from said standards, each of said arms having their extremities notched and article-supporting means removably mounted in the notches of said arms.

In testimony whereof I affix my signature.

LOUIS C. DEMMERLE.